United States Patent [19]

Cornell, III et al.

[11] Patent Number: 5,383,329
[45] Date of Patent: Jan. 24, 1995

[54] ROTARY LAWN MOWER BLADE WITH REPLACEABLE CUTTING EDGE

[75] Inventors: Harold P. Cornell, III, Orlando; Philip T. Werginz, Winter Springs, both of Fla.

[73] Assignee: Switchblade, Inc., Orlando, Fla.

[21] Appl. No.: 243,386

[22] Filed: May 16, 1994

[51] Int. Cl.⁶ ............................................. A01D 34/00
[52] U.S. Cl. ............................................. 56/255; 56/295
[58] Field of Search .......... 56/255, 289, 295, DIG. 17, 56/DIG. 20

[56] References Cited

U.S. PATENT DOCUMENTS

| | | | |
|---|---|---|---|
| 2,932,147 | 4/1960 | Beeston, Jr. | 56/295 |
| 3,097,468 | 7/1963 | Johnson | 56/295 |
| 3,327,460 | 6/1967 | Blackstone | 56/295 |
| 3,514,935 | 6/1970 | Bonsor | 56/295 |
| 3,563,015 | 2/1971 | Renfroe | 56/295 |
| 3,665,692 | 5/1972 | Hughes | 56/295 |
| 3,769,784 | 11/1973 | Jones | 56/295 |
| 4,375,148 | 3/1983 | Beck | 56/295 |
| 4,445,315 | 5/1984 | Roszkowski | 56/295 |
| 4,471,603 | 9/1994 | Veltin, Jr. | 56/295 |
| 4,651,510 | 3/1987 | Malutich | 56/295 |
| 4,779,407 | 10/1988 | Pattee | 56/295 |
| 5,018,347 | 5/1991 | Feilen | 56/295 |
| 5,036,654 | 8/1991 | Malutich | 56/255 |
| 5,303,535 | 4/1994 | Smith | 56/255 |

Primary Examiner—Michael Powell Buiz
Attorney, Agent, or Firm—Edward M. Livingston

[57] ABSTRACT

A combination lawn mower blade (1) with replaceable cutting edge pieces (2a, 2b) mounted on the forwardly rotating cutting surfaces (25a, 25b) of the blade (1). The elongated blade (1) has top and bottom surfaces (8) and (16), respectively, with tips (24a, 24b) in a centrally located hole (7) for attachment to an engine shaft of a rotary lawn mower or the like. The blade (1) has a set of grooves (12a, 12b, 15a, 15b) and steps (13a, 13b, 14a, 14b) cut into the forward cutting surfaces (25a, 25b). The cutting edge pieces (2a, 2b) have a sharp cutting surface (10a, 10b, 22) which inclines upwardly on top to a flat top surface (20) and also have a flat bottom surface (11). A channel (26) in the cutting edge pieces (2a, 2b) is cut between the top and bottom surfaces (20, 11) and contains a set of groves and steps matching those on the blade (1) so the cutting edge pieces (2a, 2b) slide onto the blade (1) from the direction of the center of the blade (1). The set of grooves and steps on the blade (1) is cut so that a space is left between the cut and the tip of the blade so that the cutting edge pieces (10a, 10b) are blocked from flying off the blade (24a, 24b) due to centrifugal force during rotation. The blade (1) may have upwardly curved portions (3a, 3b) on the rearward edges near the tips (24a, 24b) of the blade opposite the cutting edge pieces (10a, 10b) to help produce aerodynamic lifting of the grass for better cutting.

8 Claims, 2 Drawing Sheets

ROTARY LAWN MOWER BLADE WITH REPLACEABLE CUTTING EDGE

BACKGROUND OF THE INVENTION

This invention relates to rotary lawn mowers and the like, and more particularly, to a replaceable cutting edge for lawn mower blades and the like.

Currently, when the blades of a rotary lawn mower become dull or worn, it is necessary to remove and replace the entire blade body with a new blade. Sometimes the blade can be sharpened while it is still attached to the lawn mower engine shaft, however, the latter is difficult as it requires lifting the mower and there is a risk of cutting oneself as the entire lawn mower blade has to be replaced, there is a high cost in terms of labor and material, especially for landscaping companies, which may be required to do so on at least a daily basis.

Thus, there exists a need for a lawn mower blade with a cutting edge that can be easily replaceable without having to replace the entire lawn mower blade body.

The prior patented art includes many replaceable cutting edges for lawn mower blades, but none just like the present invention. The prior patented art includes the following:

| U.S. Pat. No. | Inventor | Issue Date |
|---|---|---|
| 5,018,347 | Feilen | May 28, 1991 |
| 5,036,654 | Malutich | Aug. 6, 1991 |
| 4,779,407 | Pattee | Oct. 25, 1988 |
| 4,445,315 | Roszkowski | May 1, 1984 |
| 3,769,784 | Jones | Nov. 6, 1973 |
| 3,097,468 | Johnson | July 16, 1963 |
| 4,471,603 | Veltin Jr. | Sept. 18, 1984 |
| 3,514,935 | Bonsor | June 2, 1970 |
| 3,327,460 | Blackstone | June 27, 1967 |
| 2,932,147 | Beeston, Jr. | April 12, 1960 |
| 3,563,015 | Renfroe | Feb. 16, 1971 |
| 3,665,692 | Hughes | May 30, 1972 |
| 4,651,510 | Malutich | March 24, 1987 |
| 4,375,148 | Beck | March 1, 1983 |

The Feilen patent teaches a removable cutting edge that requires an entirely new blade with a cut, the forwarding rotating surfaces of the blade into which the cutting edge is inserted. In Feilen, the cut destroys the structural integrity of the blade. The Malutich patent teaches a different replaceable cutting edge that is secured by clips to a lawn mower blade. The Pattee patent shows another replaceable cutting edge that is attached by inserting a retaining arm on the blade into a slot in the cutting edge. The Roszkowski patent teaches yet another replaceable cutting edge that snaps onto the blade and emits an audible tone if the cutting edge is not installed correctly. The Jones patent shows another removable cutting blade in which the cutting edges are attached to the blade by a nut and bolt. The Johnson patent teaches replaceable cutting edges that slide into the blade and use a disk on the inner end to keep the blade in place against the centrifugal force caused by blade rotation. The Veltin, Jr. patent teaches another removable cutting edge for lawn mower blades which uses two bands to hold the edges to the blade. The Bonsor patent teaches another removable cutting edge which is held to the blade by nuts and bolts. The Blackstone patent shows removable cutting edges using rivets and a bolt/nut combination to hold it to the blade. The Beeston, Jr. patent teaches other removable cutting edges held on by rivets that slide into a slot on the blade.

The Renfroe patent shows removable cutting edges that slide into channels at the end of the blades. The Hughes patent shows another removable cutting edge which is held on by nuts and bolts. The second Malutich patent teaches removable cutting edges which fit into specially designed mower blades. Finally, the Beck patent shows yet other removable cutting edge that is attached to the blade by insertion into a wedged slot on the blade.

Contrary to the above referenced prior patented art, the present invention allows the use of a fairly standard lawn mower blade which merely has a series of grooves and steps machined onto the forward cutting surfaces of the blades. The removable cutting edges contain a channel with matching grooves and steps which allows the edges to be easily and quickly slided onto the blades. As the present invention does not require a cut into the edges of the blades or snaps, nuts or bolts, the structural integrity and aerodynamic properties of the lawn mower blade are maintained.

SUMMARY OF THE INVENTION

The primary object of the present invention is to provide a combination rotary lawn mower blade with replaceable cutting edge pieces which eliminate the need to replace the entire blade when it becomes dull or worn.

Another object of the present invention is to provide such removable cutting edge pieces which are easily and quickly removable.

A further object of the present invention to provide a lawn mower blade for use with replaceable cutting edges which has a longer use life.

An even further object of the present invention is to provide a combination lawn mower blade and replaceable cutting edges that maintains proper aerodynamic lifting properties required for proper cutting.

An additional object of the present invention is to provide such a blade and cutting edge that reduces labor and material costs.

Another object of the present invention is to provide a lawn mower cutting blade which provides increased the safety for users.

The present invention fulfills the above and other objects by providing a blade with removable cutting edge pieces on forward rotating cutting surfaces for mounting through powered-rotary lawn mowers and the like. The elongated blade has a centrally located hole for attachment to an engine shaft and a set of grooves and steps on its forward rotating surfaces. The removable cutting edge pieces have a channel on the inner edge between the top and bottom surfaces which contains complementary grooves and steps to those on the forward rotating surfaces of the blade so that the cutting edge pieces can be slidably mounted on the blade. The blade may have a slanted lifting surface on its rearward rotating surface to lift grass for better cutting. In order to keep the cutting edge pieces from flying off the blade due to centrifugal force, the set of grooves and steps on the blade are not made all the way to the tip of the blade. Although the sets of grooves and steps may have any number of alternating steps and grooves in order to provide proper holding of the cutting edge to the blade, both the blade and the channel and the cutting edge would preferably contain at least two steps and grooves.

Other objects and advantages of this invention will become more readily apparent when a detailed description of a preferred embodiment is described in conjunction with the illustrations appended hereto.

BRIEF DESCRIPTION OF THE DRAWINGS

This drawing figures which are used to illustrate a preferred embodiment are as follows.

DESCRIPTION OF THE PREFERRED EMBODIMENT

Figure 1:
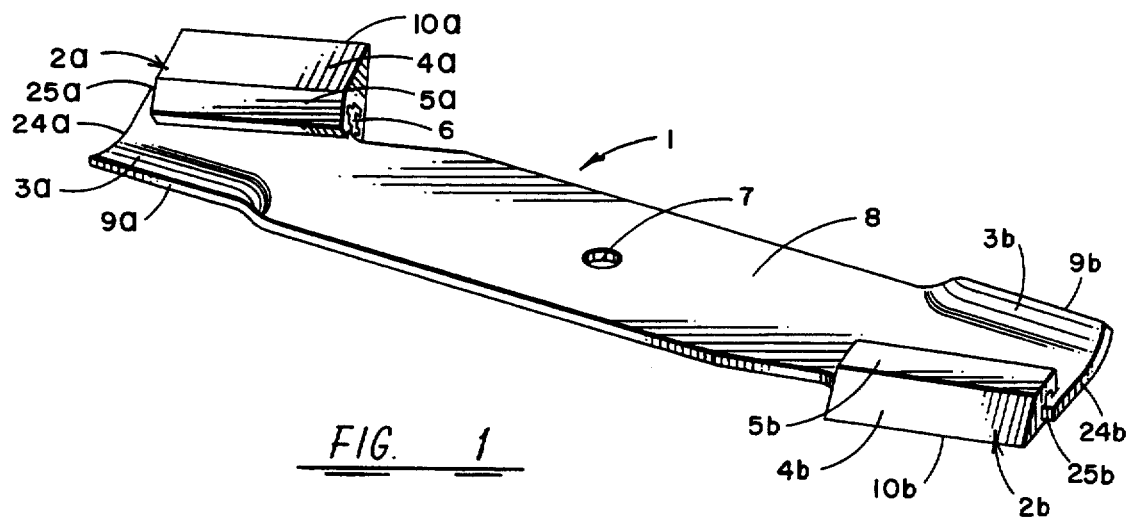
FIG. 1 is a perspective view of a rotary lawn mower blade with replaceable cutting edge pieces installed on the blade.
Figure 2:
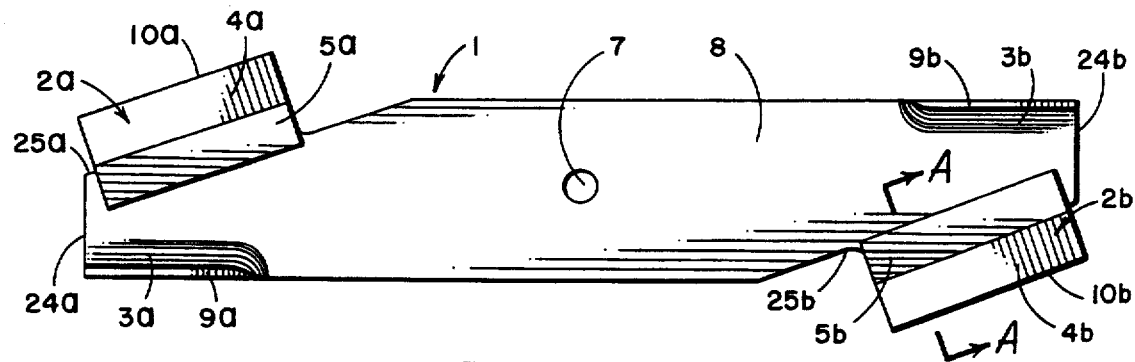
FIG. 2 is a top plan view of the blade with replaceable cutting edge pieces installed on the blade.

Referring to FIGS. 1 and 2, the lawn mower blade 1 is shown with the replaceable cutting edge pieces 2a and 2b attached to the forwardly rotating surfaces of the blade 25a and 25b. The blade 1 contains a hole 7 for mounting the blade to the engine shaft of a rotary lawn mower or similar device. The blade 1 has a top surface 8 and a bottom surface 11 shown in FIG. 3. The top surface 8 contains upwardly slanted edges 9a and 9b opposite the replaceable cutting edge pieces 2a and 2b. The blade 1 contains two tips 24a and 24b which are preferably curved. The curved tips 24a and 24b, combined with upwardly slanted edges 3a and 3b opposite the cutting edge pieces 2a and 2b, provide the proper aerodynamic structure so that when the blade 1 is rotating it will lift the grass or other materials to achieve proper cutting. Each cutting edge piece 2a and 2b contains a sharp cutting surface 10a and 10b which has an upwardly slanting portion 4a and 4b and a flat top surface 5a and 5b.

Figure 3:
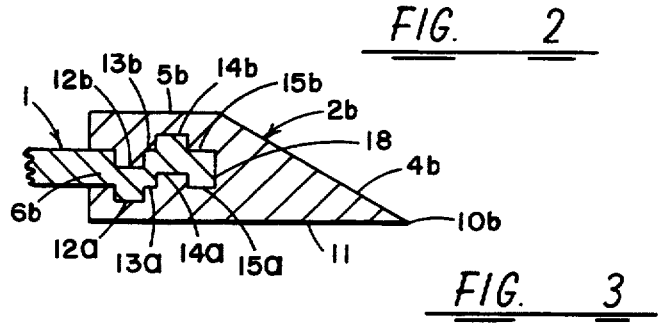
FIG. 3 is a partial cross-sectional view of the blade and cutting edge piece along lines A—A of FIG. 2.

FIG. 3 shows in more detail the forward rotating surfaces 25a and 25b of the blade 1 and one of the cutting edge pieces 2b. The blade 1, as well as the channel 23 in the cutting edge piece 26 contains a set of grooves and/or steps 12a, 12b, 13a, 13b, 14a, 14b, 15a and 15b, complementary to those in the blade 1, to properly hold the cutting edge piece 2b on the blade 1. Although the forward cutting edge 25a and 25b of the blade 1 may contain any number of steps and grooves, as illustrated herein, the blade and channel contain two sets of grooves and steps 12a and 12b and 14a and 14b with a step 13a and 13b in between and a step 15a and 15b near the outer edge of the blade 1. The grooves and steps are easily and quickly machined into the forward rotating surfaces of 25a and 25b of the blade 1 to yield a series of steps onto which the cutting edge piece 2b can be mounted when a channel 23 with complementary grooves and steps is cut between the upper surface 5b and lower surface 11 of the cutting edge piece 2b.

Figure 4:
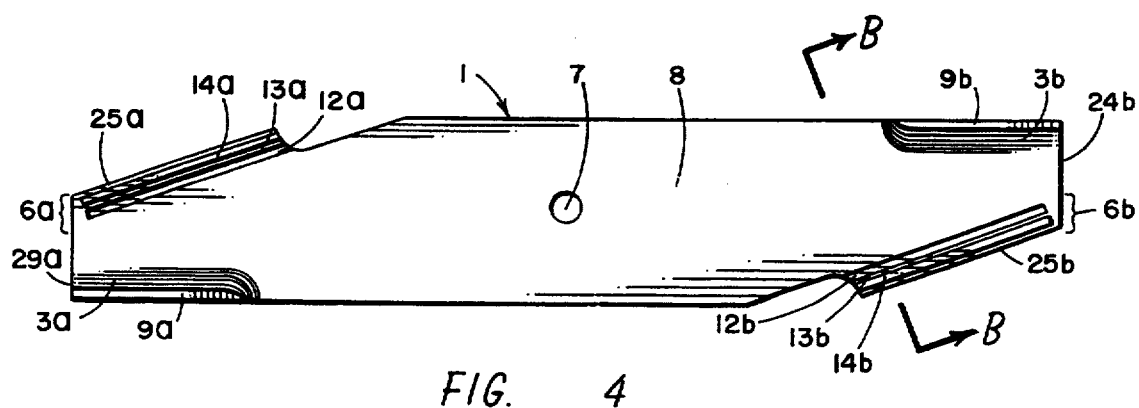
FIG. 4 is a top view of the lawn mower blade without the cutting edge pieces.

In FIG. 4 the set of steps and grooves are shown cut into the flanges 6a and 6b on the forward rotating surfaces 25a and 25b of the blade 1. It should be noted that the grooves and steps are not cut all the way to the tips 24a and 24b of the blade 1, but stop just short of the tips 24a and 24b. As a result of the latter, when the cutting edge pieces 2a and 2b are mounted the pieces do not slide off the tips of the blade 24a and 24b due to the centrifugal force which results when the blade 1 is rotated.

Figure 5:
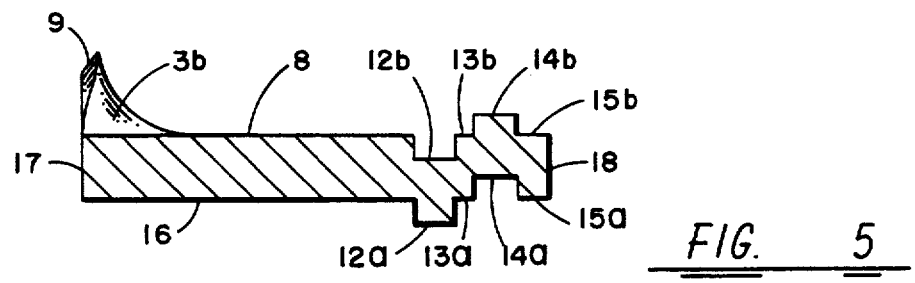
FIG. 5 is a partial cross sectional view of the lawn mower blade along lines B—B of FIG. 4.

In FIG. 5 the end of the blade 1 is shown in cross-section with the top and bottom surfaces 8 and 16, respectively, and the steps and grooves 12a and 12b and 14a and 14b with steps in between 13a and 13b and outer steps 15a and 15b at the edge 18. On the rearward surfaces of the blade opposite the grooves and steps on which the cutting edge pieces are mounted is the upwardly slanted lift portion 3b with edge 9. This lifting portion 3b helps to create an upward force when the blade 1 is rotated, thereby raising the grass for better cutting.

Figure 6:
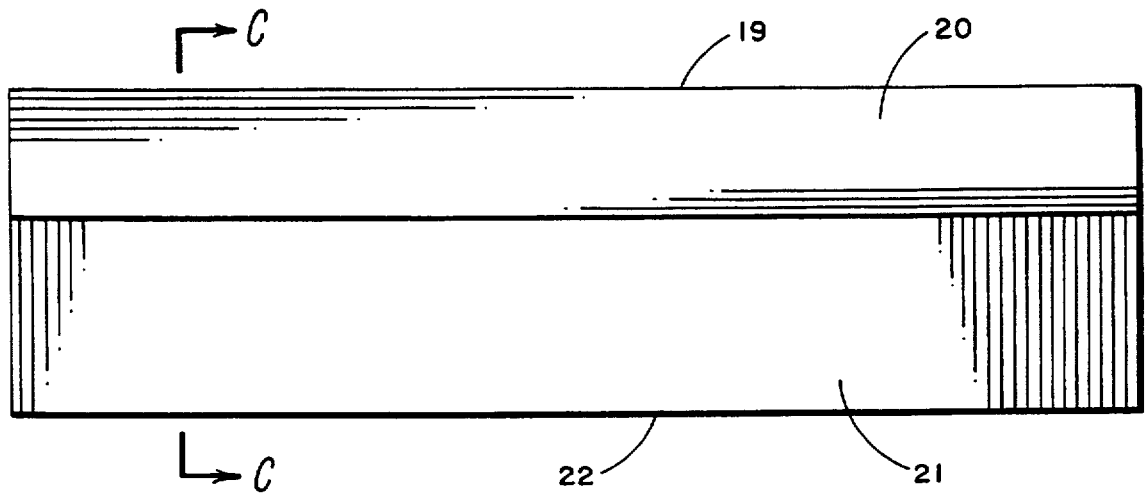
FIG. 6 is a top view of a replaceable cutting edge piece by itself.
Figure 7:
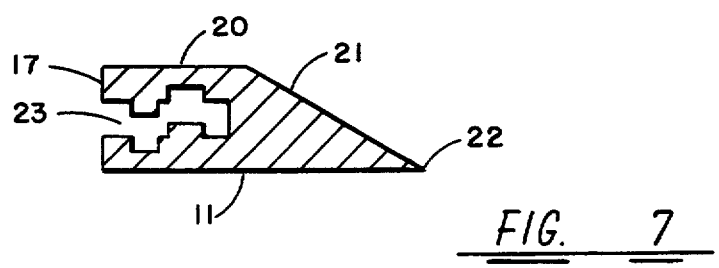
FIG. 7 is a cross-sectional view of the replaceable cutting edge piece along C—C of FIG. 6.

In FIGS. 6 and 7 a cutting edge piece is shown by itself. Each cutting edge piece has a sharp cutting surface 22 on its forward edge and an upwardly slanting portion 21 on its top surface to a flat top 20. Between the top surface 20 and the flat bottom surface 11 of each cutting edge piece a channel 23 is cut containing a series of steps and grooves complementary to those steps and grooves on flange 6 of the lawn mower blade 1.

The lawn mower blade could be made of almost any rigid material, such as steel, aluminum or alloy. The blade 1 itself would be just like a conventional lawn mower blade, except rather than having a sharp cutting surface on its forward rotating edge, it would instead have a set of grooves and steps milled into its forward rotating edges. The cutting edge pieces, because they are not part of the blade, could be made of almost any material, but would preferably be made of a light metal or alloy, such as aluminum. The cutting edge pieces would be easily mounted to the blade by placing them on the inner beginning of the flange into the channel of the cutting edge pieces with a slight tap of a hammer or other tool. Removing the cutting edge pieces when they are worn and dull for sharpening or replacement would be easily accomplished by tapping inwardly the cutting edge pieces on the outer ends so that they slide off toward the center of the blade.

Although only one preferred embodiment of a lawn mower blade with replaceable cutting edge pieces has been described in detail above, all variations and modifications within the scope or equivalents of the claims are covered by this invention.

Having thus described my invention, I claim:

1. A blade with replaceable cutting edges on forwardly rotating cutting surfaces of the blade for mounting to powered rotary lawn mowers comprising:
   an elongated blade having top and bottom surfaces, two tips, a centrally located hole for attachment to an engine shaft and a set of grooves and steps along a flange on both of its forwardly rotating cutting surfaces near the tip of the blade; and
   replaceable cutting edge components having a flat bottom surface and a top surface inclined to a sharp cutting surface at a forwardly facing cutting end, said component having a notched channel between the top and bottom surfaces, said channel notched with a set of grooves and steps complementary to the grooves and steps on the blade so that the cutting edge component can be slidably mounted onto the blade.

2. The blade of claim 1 having upwardly slanted lifting surfaces on a rearward edge of the blade near the tip opposite the cutting edge component so as to provide for better cutting of grass.

3. The blade of claim 1 wherein the steps and grooves on the blade do not extend to the tip of the blade so that the cutting edge component does not fly off the blade due to centrifugal force created during rotation of the blade.

4. The blade of claim 2 wherein the set of steps and grooves on the blade do not extend to the tip of the blade so that the cutting edge component does not fly off the blade due to centrifugal force created during rotation of the blade.

5. The blade of claim 1 wherein the flange contains a set of grooves and steps consist of a first step on the top surface, a first groove cut into the bottom surface opposite said first step, a second groove cut into the top surface, a second step opposite the second groove and the cutting edge component contains a complementary set of grooves and steps so that the grooves and steps on the blade slide into the channel in the cutting edge component.

6. The blade of claim 2 wherein the flange contains a set of grooves and steps consist of a first step on the top surface, a first groove cut into the bottom surface opposite said first step, a second groove cut into the top surface, a second step opposite the second groove and the cutting edge component contains a complementary set of grooves and steps so that the grooves and steps on the blade slide into the channel in the cutting edge component.

7. The blade of claim 3 wherein the flange contains a set of grooves and steps consist of a first step on the top surface, a first groove cut into the bottom surface opposite said first step, a second groove cut into the top surface, a second step opposite the second groove and the cutting edge component contains a complementary set of grooves and steps so that the grooves and steps on the blade slide into the channel in the cutting edge component.

8. The blade of claim 4 wherein the flange contains a set of grooves and steps consist of a first step on the top surface, a first groove cut into the bottom surface opposite said first step, a second groove cut into the top surface, a second step opposite the second groove and the cutting edge component contains a complementary set of grooves and steps so that the grooves and steps on the blade slide into the channel in the cutting edge component.

* * * * *